US012662851B1

(12) United States Patent
Cordova

(10) Patent No.: US 12,662,851 B1
(45) Date of Patent: Jun. 23, 2026

(54) LOCK PROTECTION DEVICE, SYSTEM, AND METHOD

(71) Applicant: Angel Ernest Cordova, Aurora, CO (US)

(72) Inventor: Angel Ernest Cordova, Aurora, CO (US)

( * ) Notice: Subject to any disclaimer, the term of this patent is extended or adjusted under 35 U.S.C. 154(b) by 0 days.

(21) Appl. No.: 19/384,154

(22) Filed: Nov. 10, 2025

(51) Int. Cl.
*E05B 67/38* (2006.01)
*E05B 67/36* (2006.01)

(52) U.S. Cl.
CPC ............ *E05B 67/383* (2013.01); *E05B 67/36* (2013.01); *E05B 67/38* (2013.01)

(58) Field of Classification Search
CPC ......... E05B 67/36; E05B 67/38; E05B 67/383
See application file for complete search history.

(56) References Cited

U.S. PATENT DOCUMENTS 3,736,016 A * 5/1973 Garvey .................. E05B 67/38 292/281
4,666,106 A * 5/1987 Kohout ................. B64C 1/1423 70/94
4,754,626 A * 7/1988 Siegel ..................... E05B 67/36 70/32
5,172,574 A 12/1992 Perfetto
5,469,722 A 11/1995 Ellefsen
5,669,255 A * 9/1997 Albano ............... E05B 17/2084 70/381
5,946,952 A * 9/1999 Mintchenko .............. E05C 7/00 70/32
6,796,154 B2 * 9/2004 Gebow .................. B60R 25/09 70/237
6,854,303 B2 * 2/2005 Shiao ...................... E05B 67/38 70/2
6,868,702 B1 * 3/2005 Alkire .................. E05C 19/003 70/DIG. 56
6,915,670 B2 * 7/2005 Gogel ..................... E05B 67/38 70/32
7,047,774 B1 * 5/2006 Gogel ................. E05B 65/0021 70/32
8,210,007 B1 * 7/2012 Laracy .................... B60R 25/09 70/432
9,184,573 B1 * 11/2015 Jonas ....................... H02G 1/00
11,814,878 B2 11/2023 Lee, II et al.
2014/0137611 A1 5/2014 Loughlin et al.
2024/0102322 A1 * 3/2024 Curry ..................... H04Q 1/025
2024/0318468 A1 9/2024 Cordova et al.
2024/0381547 A1 * 11/2024 Fermin ................ H05K 5/0208
2025/0320758 A1 * 10/2025 Searfoss ............. E05B 63/0052

* cited by examiner

*Primary Examiner* — Christopher J Boswell
(74) *Attorney, Agent, or Firm* — Dunlap Bennett & Ludwig PLLC

(57) ABSTRACT

A lock protection device, system and method that stymies thieves from tampering with a target lock of a cage is disclosed. The lock protection device provides a lock bar extending from a shield box fixed to one side of the cage, through the cage by way of an anchor plate, and through and into a lock shield fixed to another side of the case. A distal end of the lock bar projects into a lock area defined by the lock shield, wherein the target lock occupies the lock area while being collared by the lock shield. The target lock operatively associates with the distal end of the lock bar to prevent tampering and unauthorized removal of the target lock.

18 Claims, 10 Drawing Sheets

LOCK PROTECTION DEVICE, SYSTEM, AND METHOD

BACKGROUND OF THE SUBJECT DISCLOSURE

The present subject disclosure relates to locking systems and, more particularly, to a lock protection device, system and method.

A backflow prevention device is used to protect potable water supplies from contamination or pollution due to backflow. Frequently, backflow prevention devices utilize copper parts, and since supply and demand dynamics have pushed copper prices to record highs in recent years backflow prevention devices have become sitting ducks for thieves. Which explains why in public parks where backflow prevention devices protect drinking water from chemicals sprayed on the park's grass from backflowing and contaminating the park's drinking water, the backflow prevention devices are protected by cages. Yet, the current locking systems of these cages have proven inadequate to prevent thieves from stealing the backflow prevention device or critical parts thereof. For instance, current cage locking solutions use padlocks and/or eye bolts which are easily accessible for tampering—i.e., it is easy for the would-be thief to handle and manipulate such locks- and thus can be cut and/or broken loose.

As can be seen, there is a need for a lock protection device, system and method that stymies thieves from opening a cage lock securing a backflow prevention device or other valuable objects, and as a result saves money, time, labor and prevent thievery.

SUMMARY OF THE SUBJECT DISCLOSURE

In one aspect of the subject disclosure, a lock protection device for a target lock of a cage provides the following: a lock bar extending from a shield box, through an anchor plate, and through and into a lock shield; the shield box is joined directly to the cage; and a distal end of the lock bar projects into a lock area defined by the lock shield, the lock area mutually inclusive of a footprint of the target lock wherein the target lock operatively associates with the distal end of the lock bar.

In another aspect of the subject disclosure, the lock protection device further provides wherein the anchor plate is anchored to a foundation supporting the cage, wherein the anchor plate is circumscribed by the cage; further providing a shackle hole provided by said distal end of the lock bar, wherein the shackle hole is configured to receive a shackle of the target lock; a shield plate directly connected to a first side of the cage, wherein the shield plate is directly connected to the shield box; a rear plate of the lock shield, wherein the rear plate is directly connected to a second side of the cage, opposite said first side of the cage, wherein the rear plate is directly connected to the lock shield; a lock shield projecting from the rear plate, beyond the cage, wherein the lock shield defines the lock area, wherein the lock shield provides a notch for providing access to a keyway of the target lock, or wherein the lock shield is uniform cylindrical tube throughout an entire length thereof.

These and other features, aspects and advantages of the present subject disclosure will become better understood with reference to the following drawings, description and claims.

DETAILED DESCRIPTION OF THE SUBJECT DISCLOSURE

The following detailed description is of the best currently contemplated modes of carrying out exemplary embodiments of the subject disclosure. The description is not to be taken in a limiting sense but is made merely for the purpose of illustrating the general principles of the subject disclosure, since the scope of the subject disclosure is best defined by the appended claims.

Broadly, an embodiment of the present subject disclosure provides a lock protection device, system and method that stymies thieves opening cages securing the backflow prevention device, and as a result save money, time, labor and prevent thievery.

Figure 9:
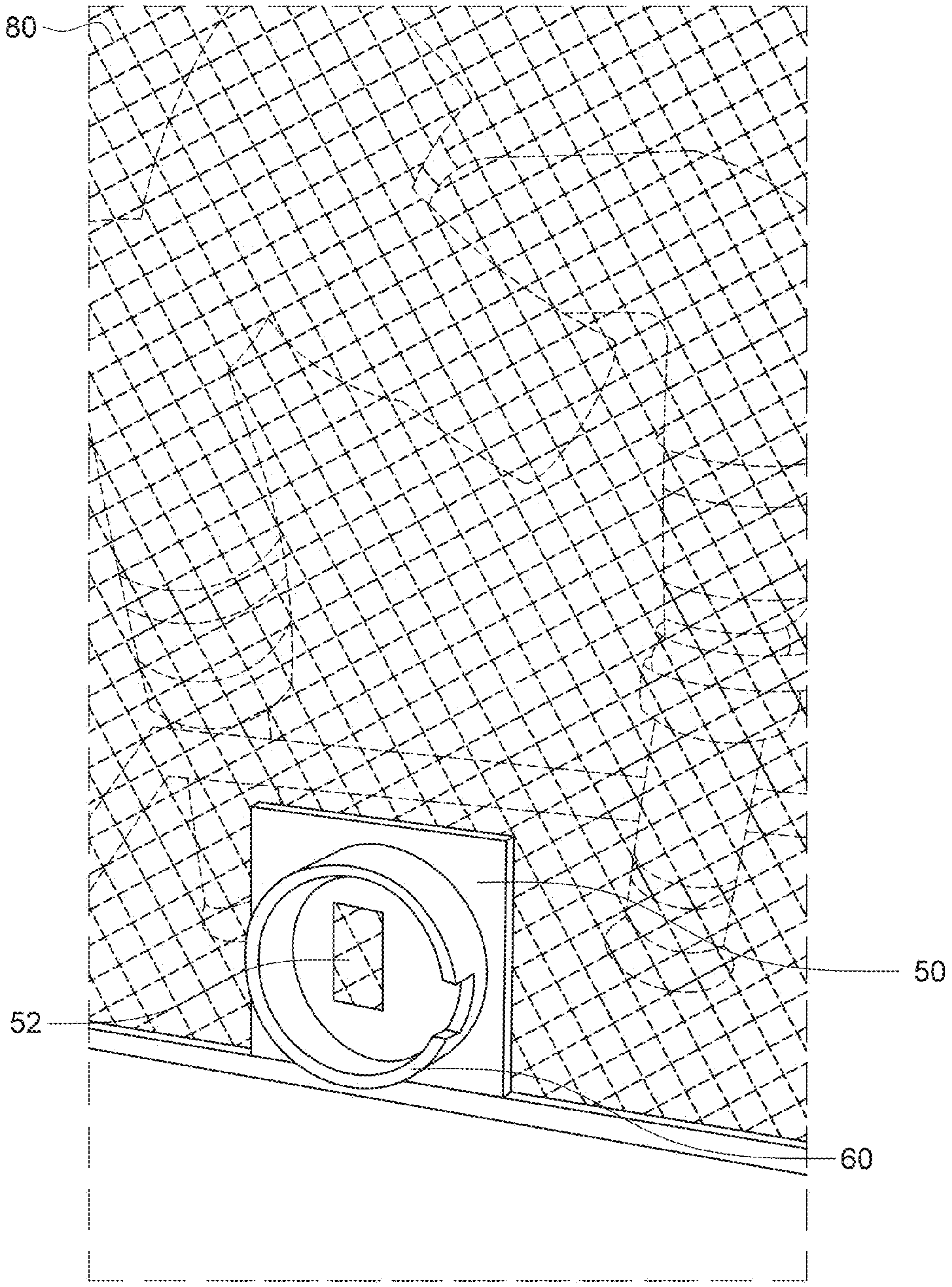
FIG. 9 is a perspective view of an exemplary embodiment of lock shield 60 of the subject disclosure shown installed on the lock or first side of cage 80, wherein the lock shield 60 is connected directly to the first side of cage 80, without the target lock 90 or remaining portions of the lock protection device installed for illustrative purposes.
Figure 12:
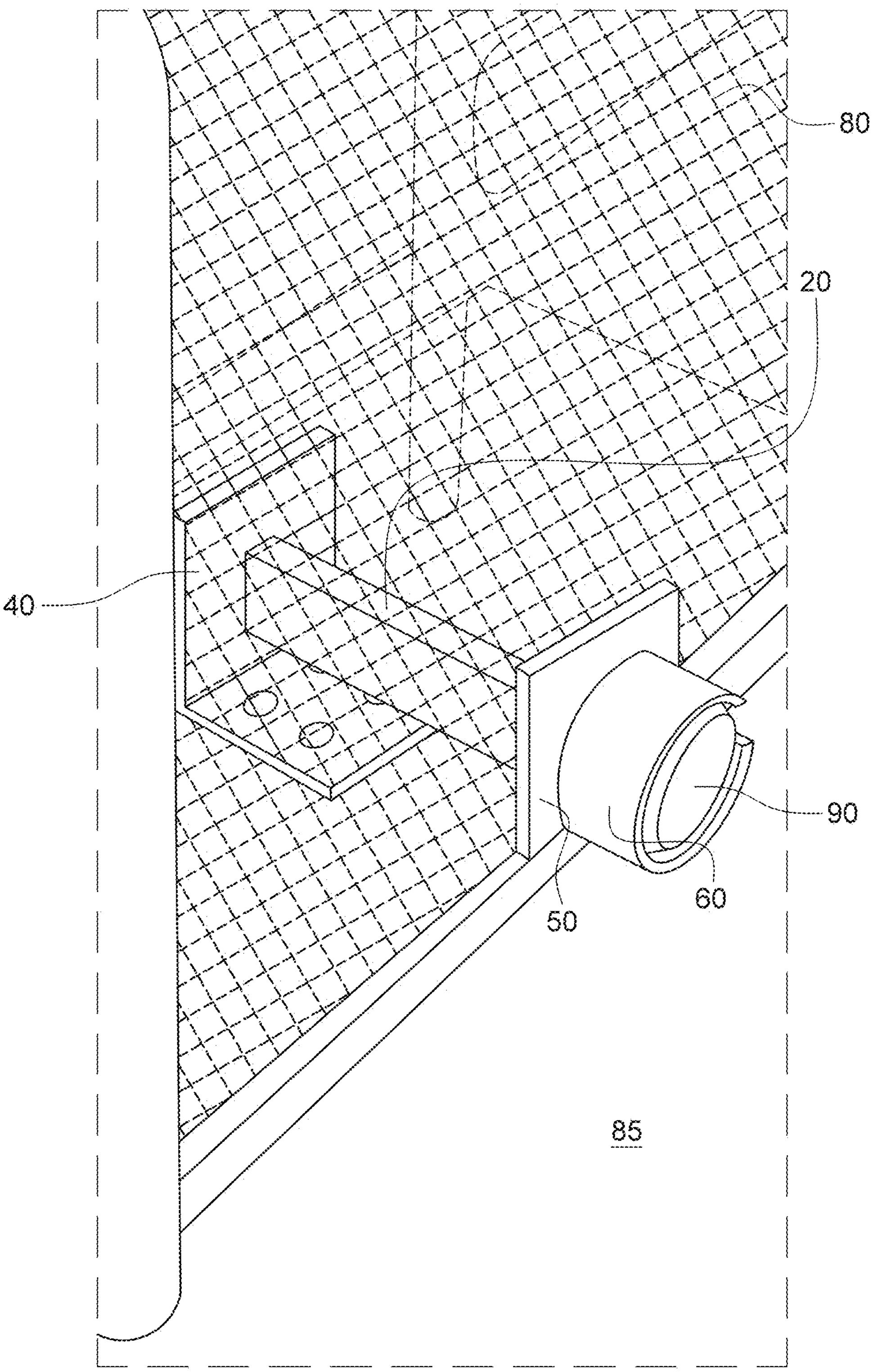
FIG. 12 is a perspective view of an exemplary embodiment from the first side of cage 80 illustrating shield lock 60 and the anchor plate 40 (directly connected to the foundation 85 of the cage 80) operatively associated with lock bar 20.
Figure 13:
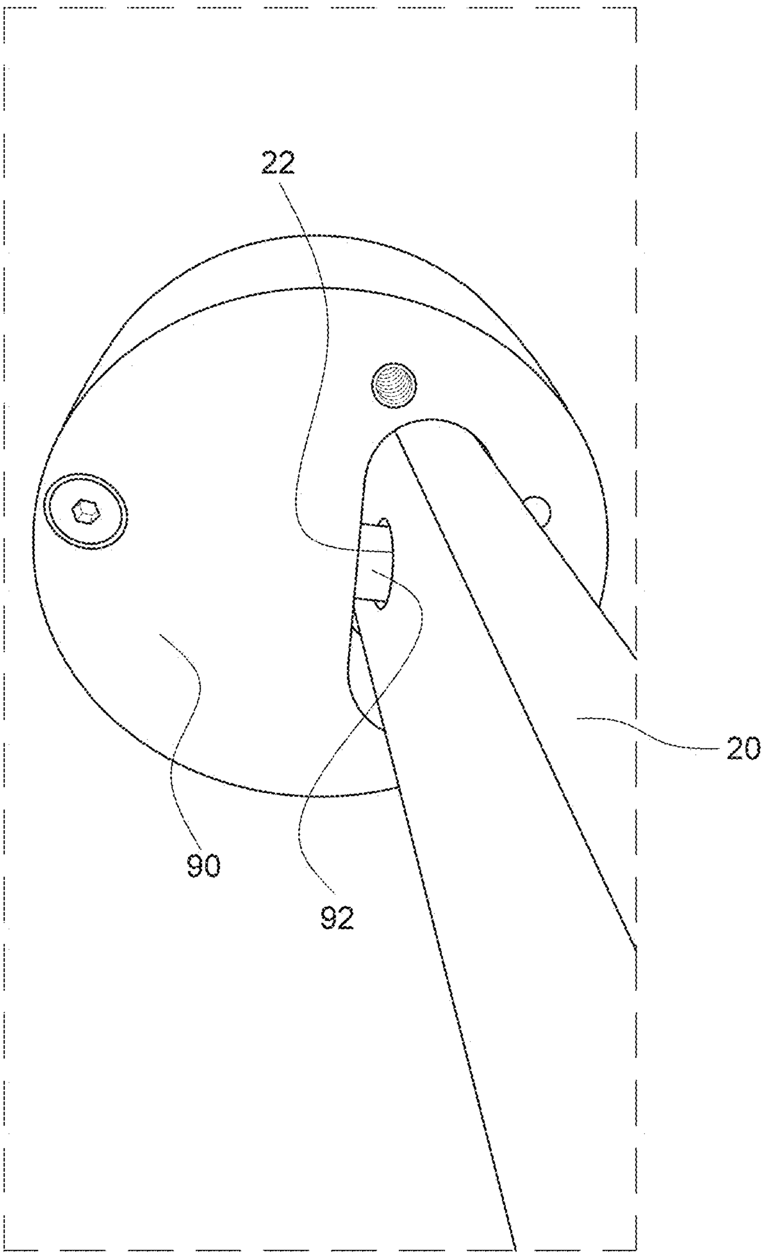
FIG. 13 is a rear perspective view of an exemplary embodiment of the lock bar 20 engaged with the target lock 90, wherein a shackle hole 22 of the lock bar is configured to receive a shackle 92 of the target lock 90.

Referring to FIGS. 1 through 13, a lock protection device 100 embodied in the subject disclosure is illustrated to show how it is adapted to protect a target lock 90 of cage 80. The cage 80 circumscribes a protected area, typically supported by foundation 85, housing important equipment or objects (shown in FIG. 9 through 12), including but not limited a backflow prevention device. The lock protection device 100 may include a shield box 30, an anchor plate 40, and a lock shield 60, all of which are operatively associated with a lock bar 20 so that said target lock 90 of said cage 80 can be protected and guarded by lock shield 60. The lock shield 60 may be directly connected to a shield plate 50 that in turn is directly connected to a lock side or first side of cage 80 wherein the target lock 90 is to be located, as illustrated in FIGS. 9 and 12.

Figure 10:
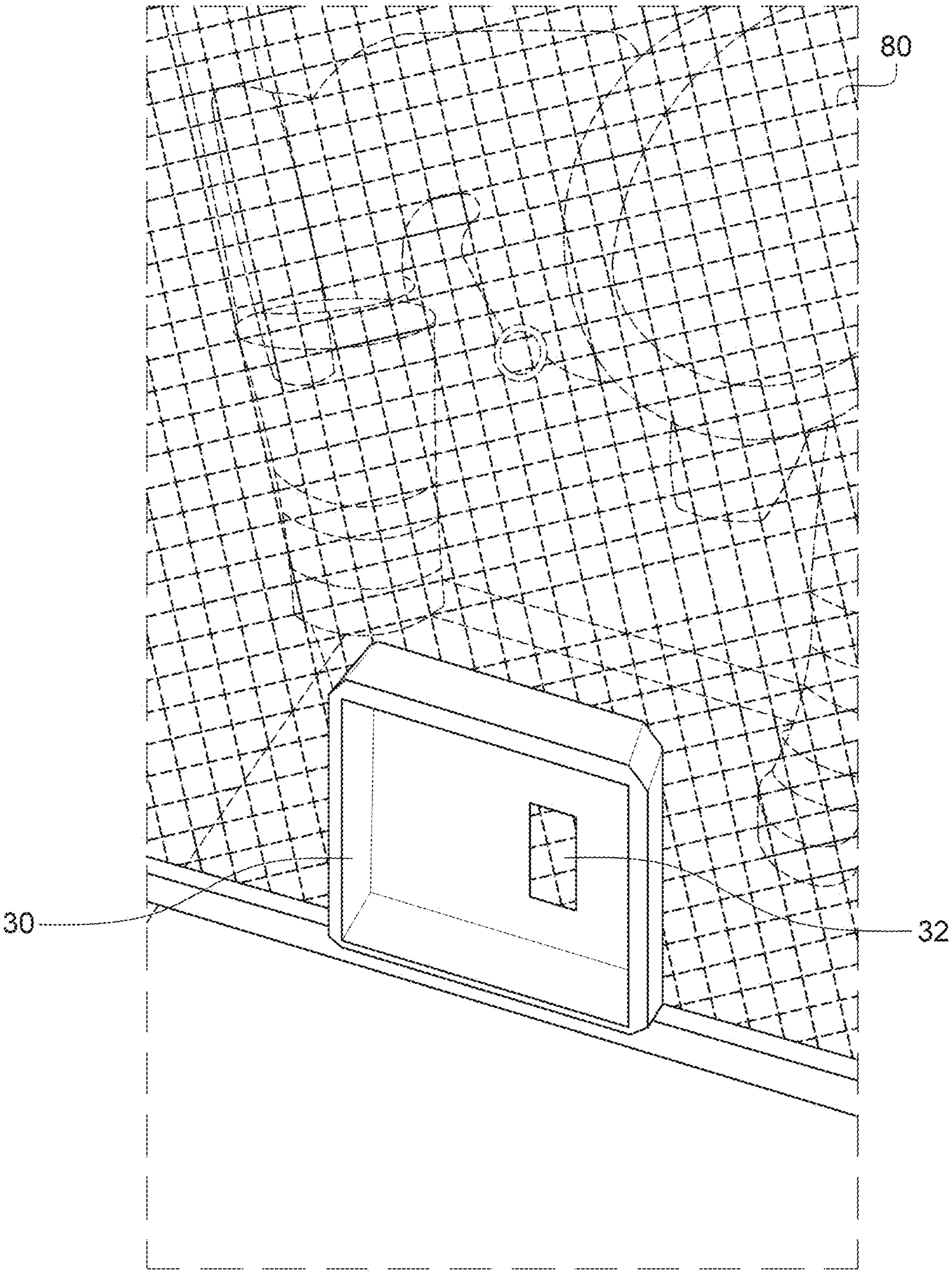
FIG. 10 is a perspective view of an exemplary embodiment of shield box 30 of the subject disclosure shown installed on the second side (opposite the first side shown in FIG. 9) of cage 80, wherein the shield box 30 is connected directly to an external surface of the second side of cage 80, without the lock bar 20 or remaining portions of the lock protection device installed for illustrative purposes.
Figure 11:
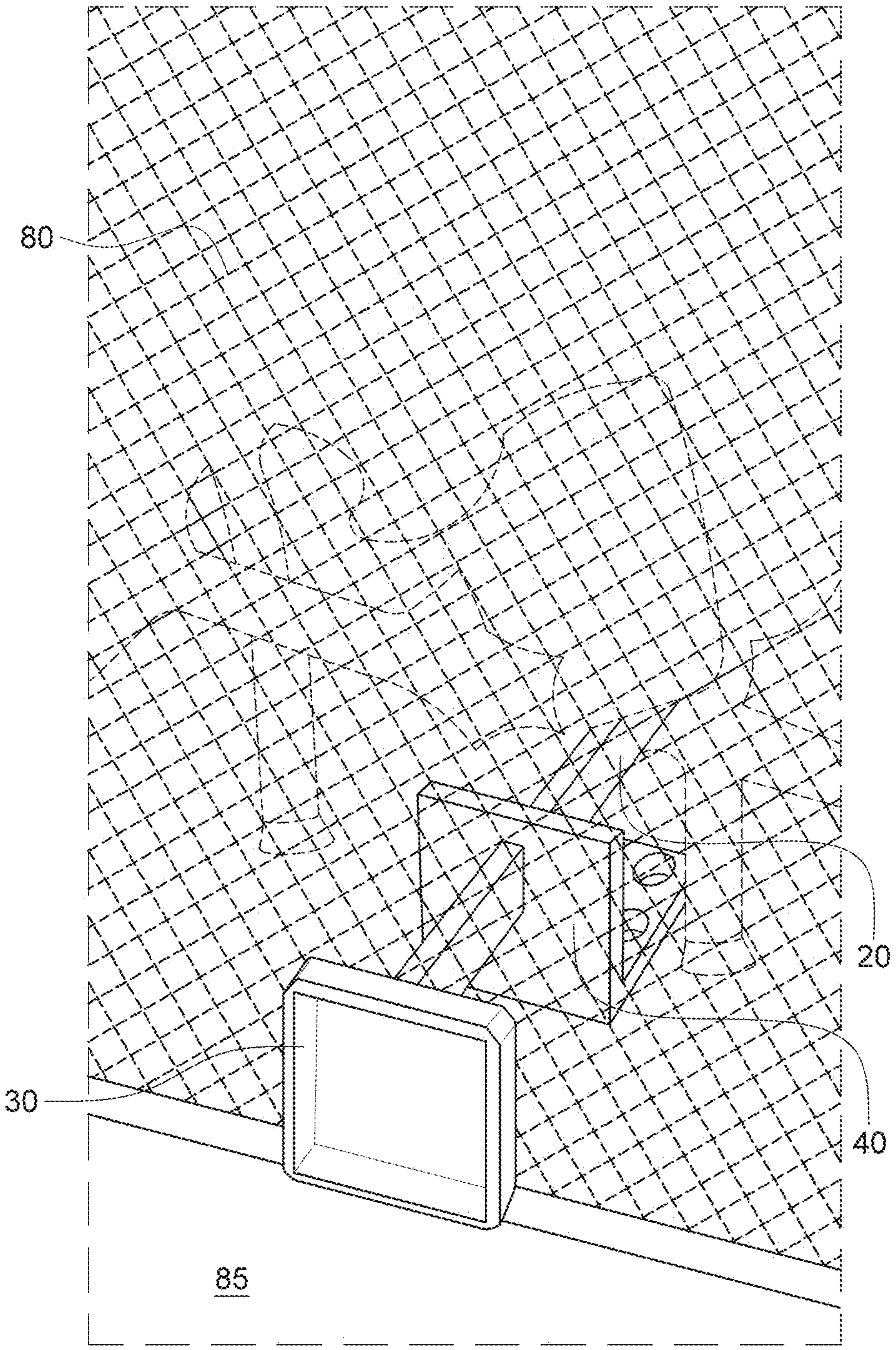
FIG. 11 is a perspective view of an exemplary embodiment from the second side of cage 80 illustrating shield box 30 and the anchor plate 40 (directly connected to the foundation 85 of cage 80) operatively associated with lock bar 20.

On the opposite side of the cage 80, the "second side" thereof, a shield box 30 may be joined, see FIG. 10 showing an 'open face' shield box 30 have a box slot 32 for slidably receiving the lock bar 20. A shield plate 10 may be welded to the shield box 20 to close off access, see FIG. 8. The shield plate 10 will have a bar slot 12 for receiving the proximal end of lock bar 20 that continues to extend through the box slot 32 and then through cage 80 until the first side to engage the lock shield, as disclosed in more detail below. After receipt of lock bar 20, the shield plate 10 may be welded to the shield plate 10. Shield plate 10 is dimensioned and shaped to close off the rear side of the shield box 30, while a front plate 38 of the shield box 30 has the box slot 32 through which a remainder portion of the lock bar 20 protrudes. Shield box 30 may be directly joined to the first side of cage 80 by, for instance, welding or other rigid joining means. In other embodiments, shield plate 10 and a rear edge of the shield box 30 may sandwich a portion of cage 80 so that the shield plate 10 and said rear edge of the shield box 30 is welded to cage 80.

The distal end of lock bar 20 that protrudes through the box slot 32 continues until lock bar 20 reaches the anchor plate 40, at which point it passes through an anchor slot 42 of a vertical plate 41 of the anchor plate 40. A base plate 46 of the anchor plate 40 is fixed to the (concrete) foundation 85 of the protected area by way of fasteners.

The distal end of lock bar 20 continues through the anchor slot 42 until it slides through a rear shield plate 50 of the lock shield 60, the rear shield plate 50 having a lock slot 52, allowing a distal end of the lock bar 20 to protrude forward of the lock slot 52. The distal end of lock bar 20 projects forward of rear shield plate 50 within a lock area to be occupied by the target lock 90. The lock area is further defined by a lock shield 60. The rear shield plate 50 is joined to the first side of cage 80 (while the shield box 30 is disposed on the opposite second side), whereby the lock bar 20 extends through cage 80 to operatively associate with both the shield box 30 and the opposing rear shield plate 50 of the lock shield 60. Both the shield plate 50 and the shield box 30 project outward from an exterior surface of the cage 80 of their respective sides of cage 80 so that the lock bar 20 may slide through the external shield box 30, through the cage 80 where it engages the anchor plate 40, and finally out of the cage 80 by way of the slot 52 of the shield plate 50.

Figure 1:
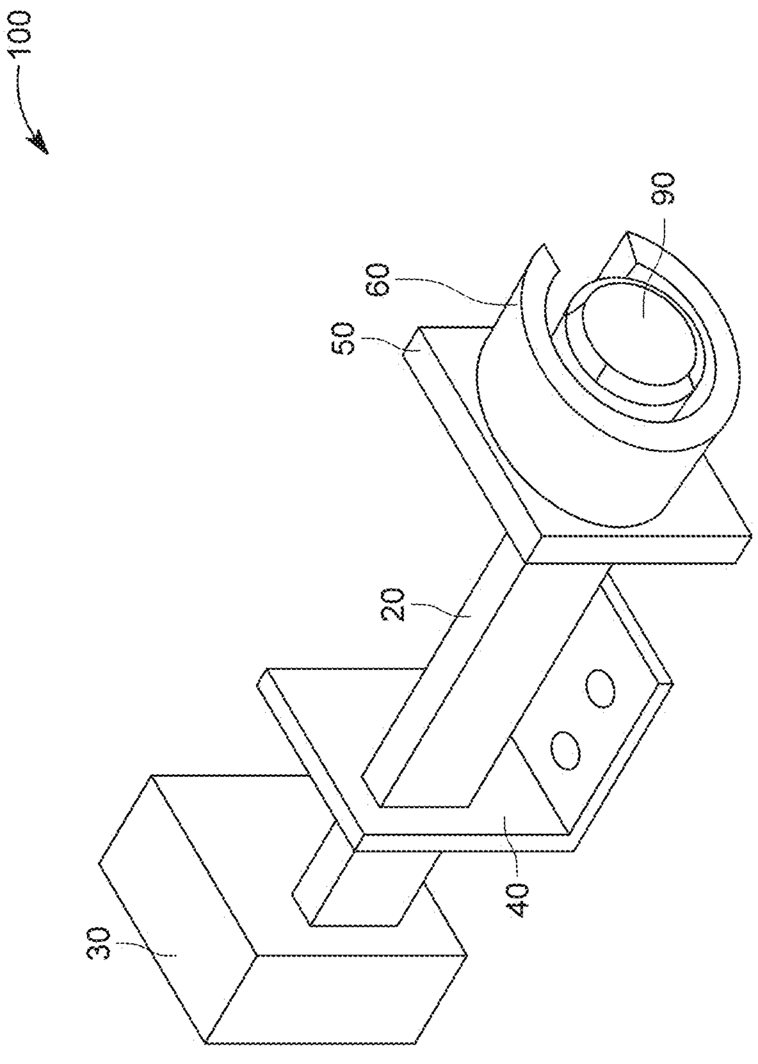
FIG. 1 is a perspective view of an exemplary embodiment of the subject disclosure of a lock protection device 100, illustrating a shield box 30, an anchor plate 40, and a shield plate 50 (which is welded to the lock shield) that all operatively associate with a lock bar 20 of the lock protection device 100 so that a target lock 90 can be protected by a lock shield 60 of the shield plate 50.
Figure 2:
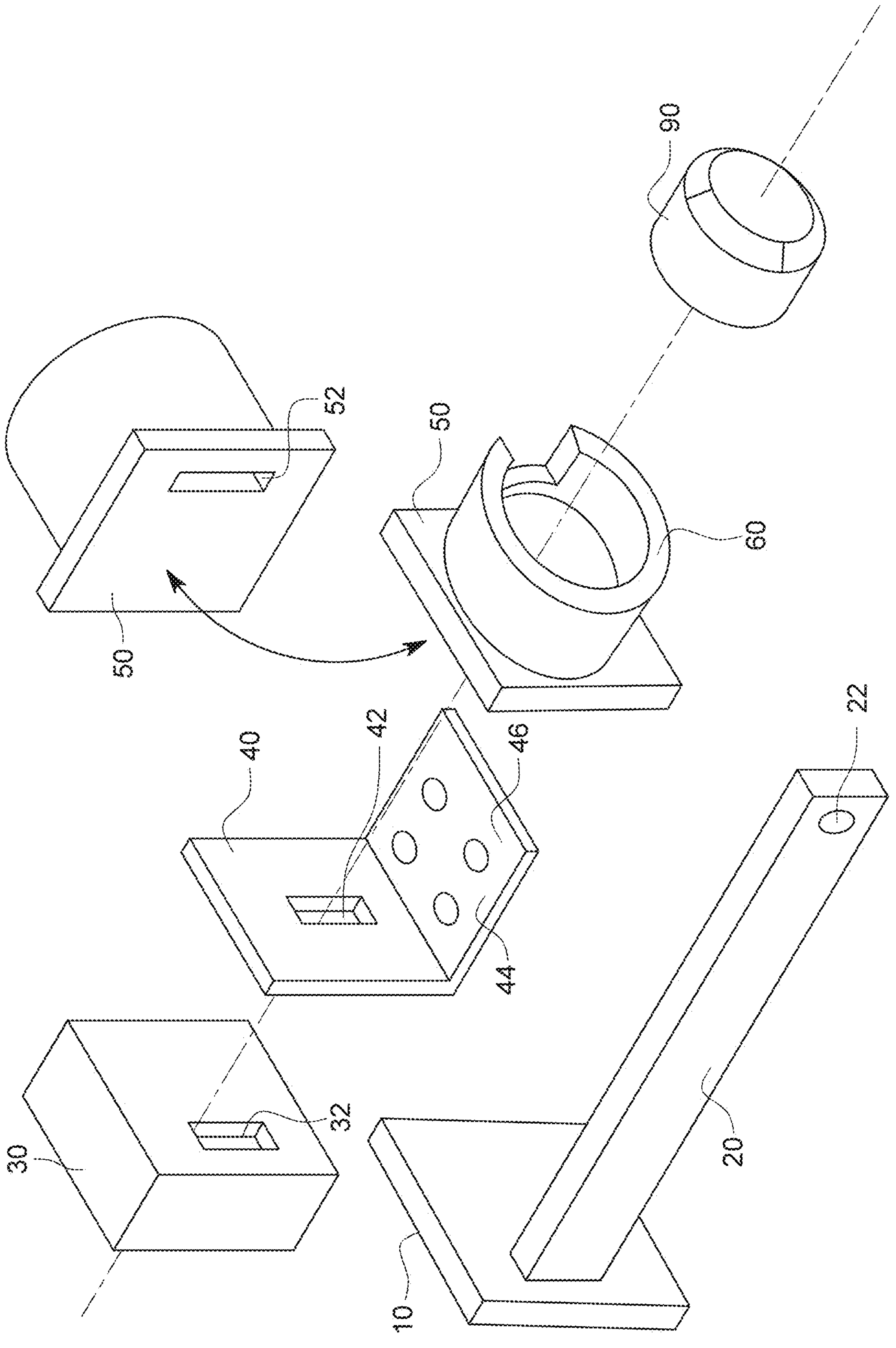
FIG. 2 is an exploded perspective view of an exemplary embodiment of the subject disclosure, illustrating the shield box 30, the anchor plate 40, and lock shield 50 dimensioned and shaped to operatively associate with lock bar 20, which is shown received in a shield plate 10.
Figure 3:
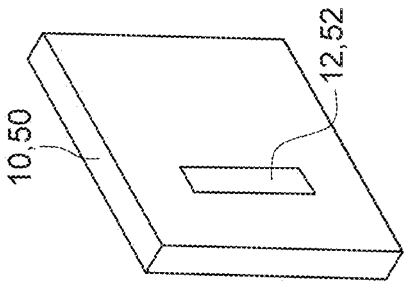
FIG. 3 is a perspective view of an exemplary embodiment of plate 10 or 50 with a bar notch 12 or 52 of the subject disclosure. In one instance the shield plate 10 closes off the rear side of the shield box 30, and in a separate instance is a rear shield plate 50 (which is welded to the lock shield) of the lock shield 60.
Figure 4:
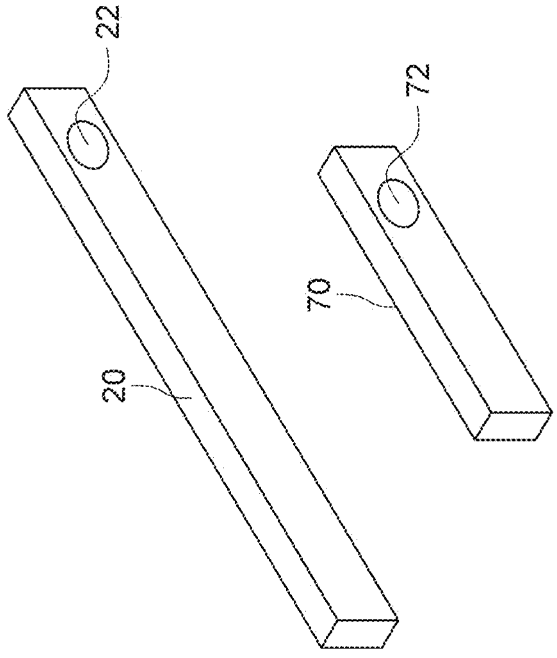
FIG. 4 is a perspective view of exemplary embodiments of lock bar 20 and lock bar 70 of the subject disclosure. Lock bar 20 is shown with a shackle hole 22 at one end, while a shorter lock bar 70 (for shorter cages 80) is also illustrated having a shackle hole 72 therethrough.
Figure 5:
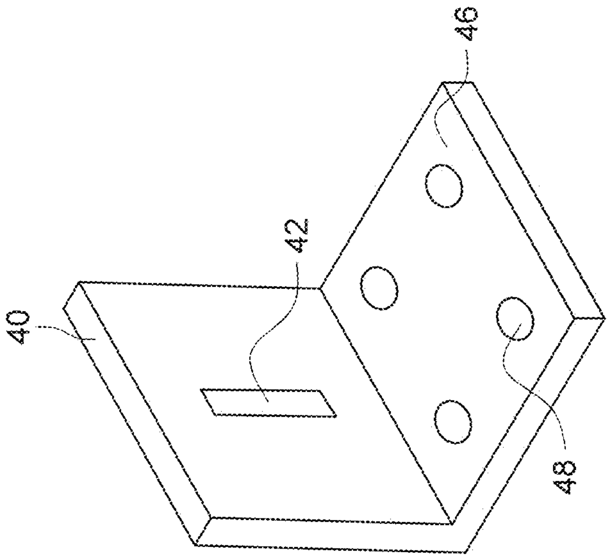
FIG. 5 is a perspective view of an exemplary embodiment of the anchor plate 40 of the subject disclosure, illustrating the orthogonal relationship between a vertical leg 41 and a base leg 46 of the anchor plate 40, as well as the holes 48 in the base leg 46 to facilitate anchoring the anchor plate 40 to concrete. The bar slot 42 of the anchor plate 40 is also shown.
Figure 7:
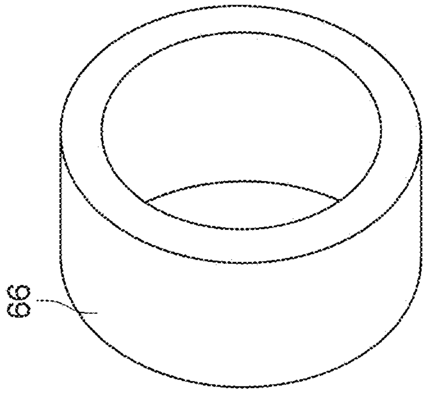
FIG. 7 is a perspective view of an exemplary embodiment of a notch-less lock shield 66 of the subject disclosure.
Figure 6:
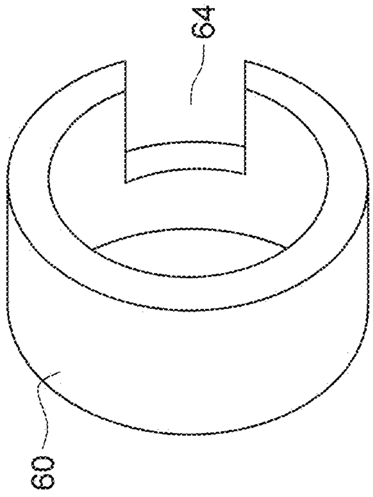
FIG. 6 is a perspective view of an exemplary embodiment of the lock shield 60 without the shield plate 50 of the subject disclosure, illustrating notch 64 of lock shield 60.
Figure 8:
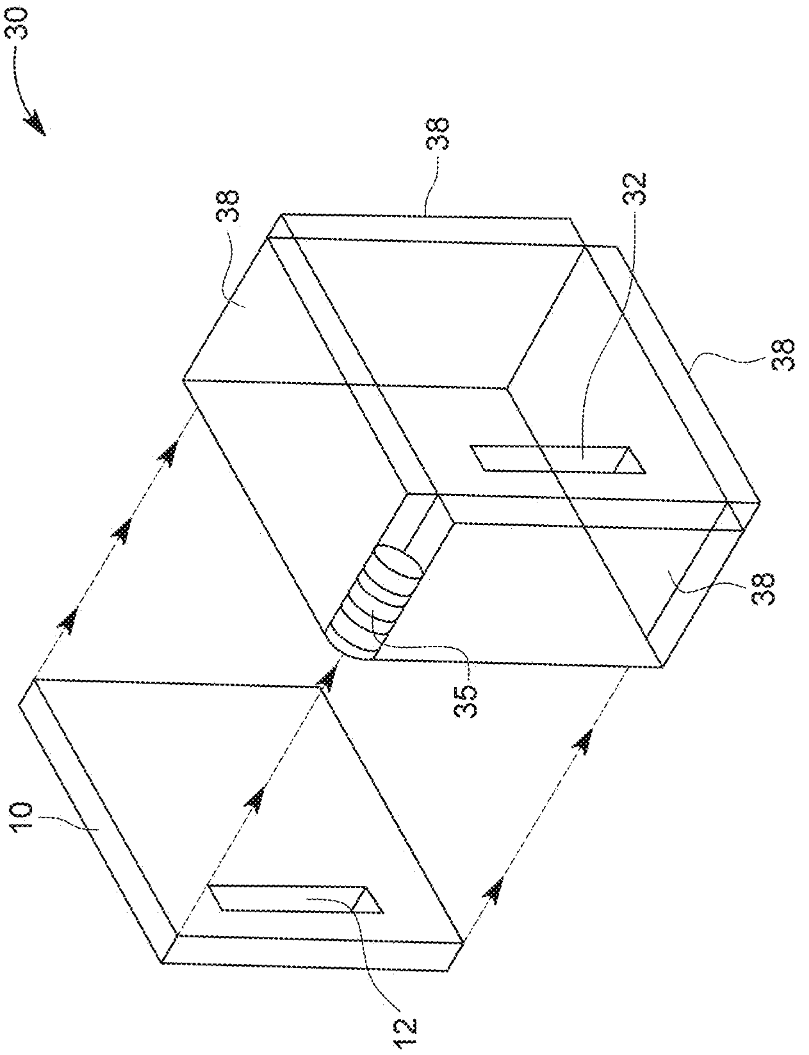
FIG. 8 is an exploded perspective view of an exemplary embodiment of the shield plate 10 and shield box 30 of the subject disclosure, illustrating how they operatively associate. Weld 35 is shown to illustrate how the shield box 30 may be built up from a plurality of box plates 38.

The distal end of lock bar 20 has a shackle hole 22 through which a hidden shackle lock pin (not shown) of the target lock 90 goes through lock bar 20 and secures all components. Lock shield 60 projects from the rear shield plate 50 to circumscribe said lock area, acting as a protective collar of the target lock 90 whereby a distance of projection of the lock shield is greater than a distance of projection of the target lock 90 relative to a shared plane. In some embodiments, the lock shield 60 has a notch 64 to accommodate a keyway of the target lock 90. In embodiments, where the target lock 90 has a forward-facing keyway (not shown) and so the lock shield 60 may be uniform, fully cylindrical tube shape, as shown in FIG. 7.

All components of the lock protection device 100 may be fabricated steel or other metallic material that is sufficient resistant to tampering through exhibiting (a) high tensile strength, which resists breaking and bending, (b) hardness which resists drilling, cutting, sawing, (c) toughness which absorbs impact without shattering, and/or (d) high yield strength, which maintains shape under force. The material may also be ceramic or plasticized materials if they are likewise sufficient to resist the aforementioned tampering as well as enable rigid joints between components, wherein the joints have strengths comparable to metallic welds as contemplated herein.

In one embodiment, by way of example, but not meant to be limiting, the shield box 30 and the shield plate 10 may be formed from a plurality of plates, such as but not limited to ¼"×1" and ¼"×4" flat stock steel, respectively. In this one embodiment the lock bar 20 may be formed from ⅜"×1½" flat bar steel, while the anchor plate 40 may be formed from an ¼"×4"×4" angle iron. And the lock shield 60 may be formed from three-inch inner diameter steel pipe with quarter-inch walls.

As used in this application, the term "about" or "approximately" refers to a range of values within plus or minus 10% of the specified number. And the term "substantially" refers to up to 80% or more of an entirety. Recitation of ranges of values herein is not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the subject disclosure and that modifications may be made without departing from the spirit and scope of the subject disclosure as set forth in the following claims.

What is claimed is:

1. A lock protection device for a target lock, the lock protection device comprises:

a shield box configured to form a first attachment point an anchor plate configured to form a second attachment point so that the entire anchor plate is rigidly fixed to the second attachment point;

the first and second attachment points are spaced apart by at least a sufficient distance so that the shield box and the anchor plate cannot touch;

a lock shield configured to form a third attachment point;

a lock bar extending from the shield box, through the anchor plate, and into the lock shield; and a distal end of the lock bar projects into a lock area defined by the lock shield, the lock area housing the target lock wherein the target lock operatively associates with the distal end of the lock bar.

2. The lock protection device of claim 1, wherein the anchor plate is has no pivot point.

3. The lock protection device of claim 2, wherein the second and third attachment points are spaced apart by at least a sufficient distance so that the anchor plate and the lock shield cannot touch.

4. The lock protection device of claim 1, further comprising a shackle hole provided by said distal end of the lock bar, wherein the shackle hole is configured to receive a shackle of the target lock.

5. The lock protection device of claim 1, further comprising a shield plate directly connected to the shield box so that the shield box defines a three-dimensional volume which a portion of the lock bar occupies.

6. The lock protection device of claim 4, further comprising a rear plate of the lock shield, wherein the rear plate provides a slot which the lock bar occupies when the target lock is operatively associated with the distal end of the lock bar.

7. The lock protection device of claim 1, wherein the anchor plate is a L-shaped plate.

8. The lock protection device of claim 7, wherein the lock shield provides a key notch for providing access to a keyway of the target lock.

9. The lock protection device of claim 7, wherein the lock shield is uniform cylindrical tube throughout an entire length thereof.

10. A lock protection system for a cage having a lock, the lock protection system comprises:

a cage;

a lock shield is joined to a first side of the cage;

a shield box is joined to a second side of the cage opposite said first side;

a lock bar extending through the cage from the shield box, through an anchor plate, and through and into the lock shield; and a distal end of the lock bar projects into a lock area defined by the lock shield, the lock area housing the target lock wherein the target lock operatively associates with the distal end of the lock bar to retain the target lock within the lock area.

11. The lock protection device of claim 10, wherein the anchor plate is anchored to a foundation supporting the cage.

12. The lock protection device of claim 11, wherein the anchor plate is circumscribed by the cage.

13. The lock protection device of claim 10, further comprising a shackle hole provided by said distal end of the lock bar, wherein the shackle hole is configured to receive a shackle of the target lock.

14. The lock protection device of claim 13, further comprising a rear plate of the lock shield, wherein the rear plate is directly connected to the first side of the cage, opposite said second side of the cage, wherein the rear plate is directly connected to the lock shield.

15. The lock protection device of claim 14, further comprising a lock shield projecting from the rear shield plate, beyond the cage, wherein the lock shield defines the lock area.

16. The lock protection device of claim 15, wherein the lock shield provides a key notch for providing access to a keyway of the target lock.

17. The lock protection device of claim 15, wherein the lock shield is uniform cylindrical tube throughout an entire length thereof.

18. The lock protection device of claim 10, further comprising a shield plate directly connected to the shield box so that the shield plate closes off a previous open face of the shield box, and wherein the shield plate is spaced apart from the cage.

* * * * *